United States Patent [19]

Korsky

[11] 4,103,112

[45] Jul. 25, 1978

[54] TELEPHONE LINE CIRCUIT WITH DIFFERENTIAL LOOP CURRENT SENSING AND COMPENSATION

[75] Inventor: Vincent Viacheslav Korsky, Kanata, Canada

[73] Assignee: Northern Telecom Limited, Montreal, Canada

[21] Appl. No.: 842,420

[22] Filed: Oct. 17, 1977

[51] Int. Cl.² .............................................. H04Q 1/28
[52] U.S. Cl. ............................... 179/18 FA; 179/81 R
[58] Field of Search .............. 179/18 F, 18 FA, 16 F, 179/70, 77, 81 R, 84 R, 84 A, 170 H; 323/48, 62

[56] References Cited

U.S. PATENT DOCUMENTS

| | | | |
|---|---|---|---|
| 3,714,548 | 1/1973 | Macrander | 323/62 |
| 4,027,235 | 5/1977 | Macrander et al. | 179/18 FA |
| 4,046,967 | 9/1977 | O'Neill | 179/18 FA |
| 4,046,968 | 9/1977 | Embree et al. | 179/18 FA |

Primary Examiner—Thomas A. Robinson
Attorney, Agent, or Firm—Frank Turpin

[57] ABSTRACT

The invention provides a telephone line circuit in which the likelihood of exposing circuit devices in an associated switching facility to potentially damaging currents or voltages is greatly reduced. A repeat coil includes a primary winding for connection to a subscriber loop circuit. Direct loop current is maintained in the primary winding and the resulting d-c flux is compensated for by a regulator including a balancing winding. The core material in the repeat coil is saturable and limited in bulk to that sufficient to transmit normal a-c voice signals across the line circuit. Signals of a magnitude which cause the core material to saturate are thereby impeded in transmission across the line circuit.

5 Claims, 1 Drawing Figure

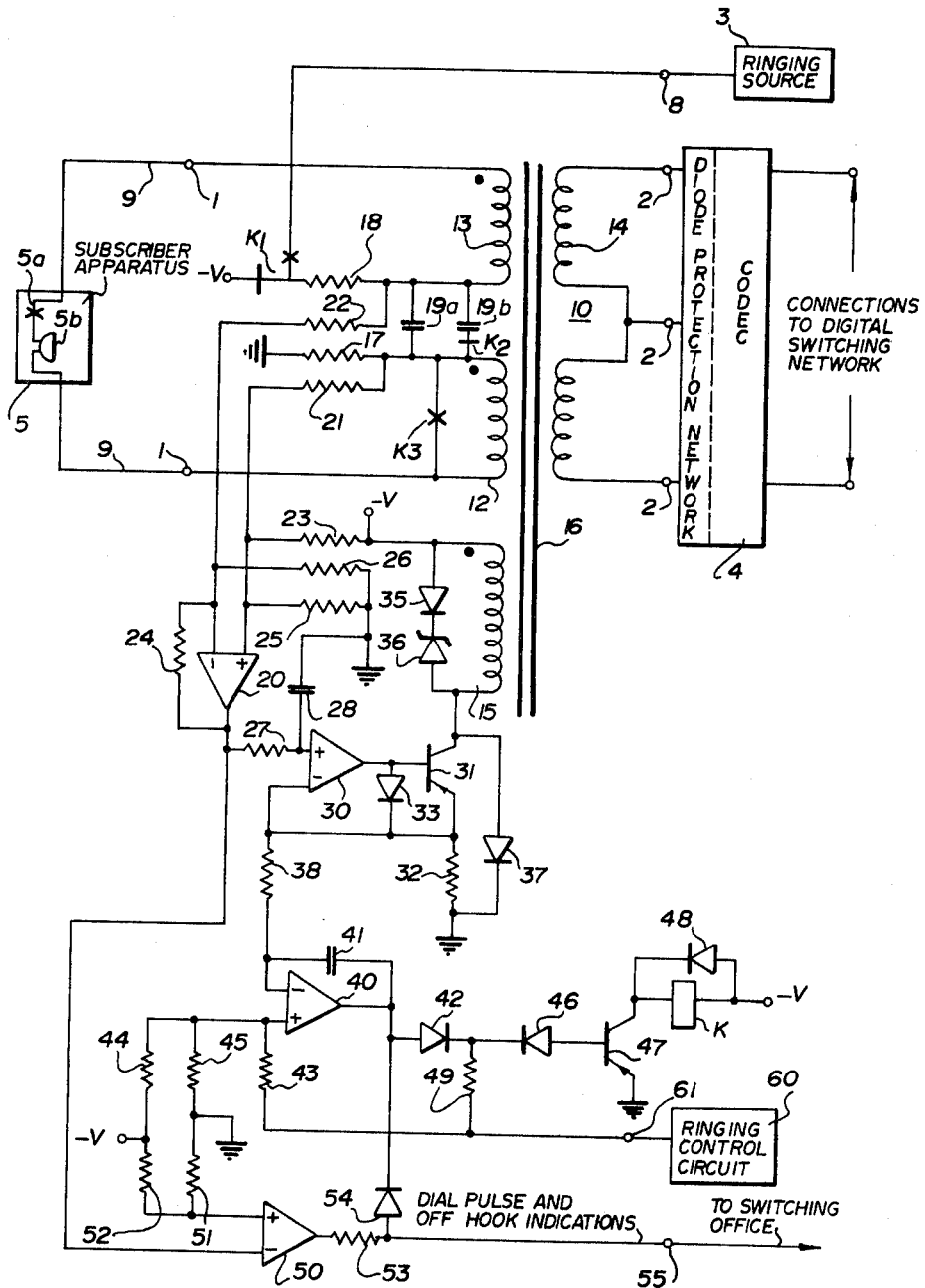

TELEPHONE LINE CIRCUIT WITH DIFFERENTIAL LOOP CURRENT SENSING AND COMPENSATION

The present invention relates to a telephone line circuit for terminating a telephone subscriber loop associated with a digital telephone system.

Digital techniques and systems first appeared in telephony as a practical trunking means between various telephone switching offices. More recently, some pulse code modulated (PCM) telephone switching systems have been developed. These systems are used mostly as private automatic branch exchanges (PABX) and comparatively few PCM telephone switching offices are used as end offices. One of the factors responsible for this disproportionate amount of use appears to be the different environments in which the systems are required to operate. For example, trunking, toll trunking facilities, and PABX facilities tend to be substantially free from serious lightning strikes or utility power line connections. On the other hand, subscriber loops tend to be far more susceptible to high voltage and current surges due to such occurrences. Furthermore, a-c high voltage ringing signals on the subscriber loops are a common operating occurrence.

PCM telephone systems require interface devices to convert analogue signals to digital signals and back again. Such a device is often termed a coder-decoder or codec and is economically provided by integrated circuit technology. Thus the operation of a practical codec tends to be limited to the required operating parameters of typical integrated circuits. One of the limitations of integrated circuits is the inability to withstand high voltage or current surges such as are from time to time experienced on a typical subscriber loop.

A typical subscriber line circuit includes a repeat coil or transformer having sufficient core material to essentially remain unsaturated while carrying the direct line current of the subscriber loop. The connection with the switching office battery is typically accomplished through a pair of balanced windings, as it has been found that this configuration is preferred for the rejection of crosstalk and other conversation interference signals that can occur.

A problem arises in the use of the typical line circuit with the typical integrated circuit codec. As the repeat coil in the line circuit includes sufficient core material to be in an unsaturated state while carrying energizing loop current, it also has the capacity to transmit substantial amounts of a-c energy in excess of normal voice signals from the subscriber loop to the codec. Hence the codec in this application becomes failure-prone during electrical storms and the like due to random occurrences of extraordinary voltage and current conditions on the subscriber loop. Surge protection such as carbon blocks or gas tubes are typically used in combination with a subscriber loop to limit the amplitude of high voltage pulses. In addition, the inputs to the codec are usually each protected by clipping diodes connected between positive and negative low voltage power sources. However, this protection has been found insufficient for reliable codec performance in a central office environment.

Improved protection against electrical storm induced voltages and the like is obtained if the repeat coil in the line circuit is reduced in size so that it is unable to transmit power very much in excess of normal voice signal power. Both Ernest S. Kelsey in U.S. Pat. No. 3,384,810 issued May 21, 1968 and Max S. Macrander in U.S. Pat. No. 3,714,548 teach direct current compensation circuits which permit a smaller transformer to be used in a subscriber line circuit. In Kelsey's circuit a tertiary winding is added to the transformer and connected to a battery via a resistor. The value of the resistor is matched or adjusted in relation to the resistance of the subscriber loop so that the loop current in the primary winding is balanced by the current through the resistor and the tertiary winding. A-C signals induced in the tertiary winding are bypassed around the resistor by a capacitor connected in parallel therewith. However, Kelsey's circuit introduces signal loss via the bypass capacitor and, in each installation of the line circuit, the value of the resistor must be adjusted for the particular subscriber loop to which the line circuit is connected.

In the patent to Macrander, the above-mentioned disadvantages are substantially overcome; however, this circuit is also unsuitable for interfacing with an integrated circuit codec.

A typical subscriber loop circuit includes tip and ring leads which can be meters or kilometers in length. Consequently, current leakage from the tip lead and from the ring lead is seldom if ever equal. Hence the loop current conducted in the opposite halves of the primary winding in a repeat coil are different and the amount of this difference varies from one subscriber loop to the next. Also, in each subscriber loop this difference changes with aging weather variations. These changes are not compensated in Macrander's circuit. The compensation circuit taught by Macrander monitors only the current from one side of the subscriber loop and compensates for the total current on the assumption that the tip and ring currents are balanced. The resulting residual d-c flux in the transformer core can be accommodated by ensuring that the core material is of sufficient bulk to prevent saturation. This solution is unusable to solve applicant's problem since it is required that only normal a-c voice signals be transmitted through the repeat coil in order that the associated codec be adequately protected.

In some cases within normal operating conditions, the subscriber loop is intentionally unbalanced by the addition of an impedance to ground at the subscriber set. By this means, individual parties on a party line are identified or the operating state of a coin telephone is ascertained. U.S. Pat. No. 3,863,036 issued to J. A. McCrudden on Jan. 28, 1975, gives an example of the application of loop imbalance. Imbalances of this type are not compensated by the circuits of Kelsey or Macrander.

The present invention is a telephone line circuit in which a transformer includes a core of saturable magnetic material, a first winding for connection to a subscriber loop and a power source, a second winding for connection to a switching facility, and a balancing winding. A current sensing circuit is responsive to current flow in the subscriber loop for generating a signal proportional to the sum of the direct current components in the tip portion and in the ring portion of the subscriber loop. A current regulation means is connected in series with the balancing winding and is responsive to the signal from the current sensing circuit to pass a current from the power source via the balancing winding in an amount sufficient to cancel the direct current flux of the first winding. Abnormally large pulse signals from the subscriber loop cause the core material to saturate and thereby impede the transmission of signals between the first and second windings.

The signal from the current sensing circuit is also useful for detecting transitions in the state of the subscriber set connected to the subscriber loop. Hence a dial tone required or a ring trip requirement, as for example indicated by the subscriber set going OFF-HOOK, is determined by additional circuits responsive to the signal from the current sensing circuit.

An example embodiment of the invention will now be described with reference to the accompanying schematic drawing of a telephone line circuit.

The telephone line circuit includes a repeat coil or transformer 10 which is illustrated as being connected between a subscriber apparatus 5 via terminals 1 and a subscriber loop 9, and a codec 4 with its associated diode protection network via terminals 2. The transformer 10 includes a first or primary winding having first and second half windings 12 and 13. The winding 12 is connected in series between ground and one of the terminals 1 via a resistor 17. The winding 13 is connected between a source of d-c power −V and the other terminal 1 via a resistor 18 and the break contact portion of relay transfer contacts K1. The resistors 17 and 18 are of similar ohmic value. The windings 12 and 13 are joined by a capacitor 19a and also joined by a series combination of a capacitor 19b and a relay break contact K2. A make relay contact K3 is connected in parallel with the winding 12. A second or secondary winding 14 is connected to the terminals 2. The make contact portion of the contact K1 is connected between the resistor 18 and a ringing source 3 via a terminal 8.

The transformer is basically similar in operation to a typical repeat coil which operates by passing current through the primary winding between ground and −V via the subscriber apparatus 5. The subscriber apparatus includes a switch hook contact 5a and a modulating device 5b, for example a carbon microphone or the like. Fluctuations imparted to the loop current flowing through the microphone 5b are passed or transmitted via the subscriber loop, the primary and secondary windings 12, 13 and 14 to the codec 4. Likewise a-c signals from the codec 4 are transmitted via the secondary and primary windings 14, 12 and 13 to the subscriber apparatus 5.

The transformer 10 also includes a balancing winding 15. All the windings 12, 13, 14 and 15 reside adjacent one another, on a ferrite pot core 16. The winding 15 is provided to compensate for direct current in the windings 12 and 13, and is poled relative the primary winding as indicated by conventional dot notation. Direct current in the balancing winding is determined by a compensation circuit which includes a current sensing circuit and a regulation circuit.

The current sensing circuit includes a differential amplifier 20 having two inputs. One input is connected to the junction between the resistor 18 and the winding 13 via a resistor 22 and the other input is connected via a resistor 21 to the junction between the resistor 17 and the winding 12. The resistors 21 and 22 are similar in ohmic value. A resistor 24 is connected between the output and the one input of the differential amplifier 20. A resistor 23, similar in ohmic value to the resistors 21 and 22, is connected between the other input and −V. The one and the other inputs of the differential amplifier are connected to ground via resistors 26 and 25 respectively. The resistances 21 − 26 in combination substantially determine the amplification factor of the differential amplifier 20.

In operation, the current sensing circuit produces a voltage signal at the output of the differential amplifier 20 which is substantially proportional to the sum of the voltages developed across the resistors 17 and 18.

The current regulation circuit includes a differential amplifier 30 having a non-inverting input connected to the output of the differential amplifier 20 via a resistor 27 and connected to ground via a capacitor 28. The output of the differential amplifier 30 is connected to the base electrode of a transistor 31. The balancing winding 15 is connected between −V and the collector electrode of the transistor 31. The emitter electrode of the transistor 31 is connected to ground via a resistor 32 and to the inverting input of the differential amplifier 30. A diode 33 is connected across the base and emitter electrodes of the transistor 31. A diode 35 and a zener diode 36 are connected in series across the balancing winding 15. A diode 37 is connected from the collector electrode of the transistor 31 to ground.

In operation, the current regulation circuit responds to the average signal voltage appearing at the output of the differential amplifier 20. Short term fluctuations having frequencies in the voice band are not responded to. The resistor 27 and the capacitor 28 act as a low pass filter having a time constant of about 50 ms. The voltage appearing at the non-inverting input of the differential amplifier 30 causes the amplifier to drive the transistor 31 to conduct current in sufficient quantity to develop a corresponding voltage across the resistor 32. Hence the ohmic value of the resistor 32 and the number of turns in the balancing winding 15 determine the proportional relationship between the signal from the current sensing circuit and the resulting ampere turns of compensation. The diode 35 and the zener diode 34 are used to short circuit any unduly large negative potentials which might be induced from the subscriber loop into the balancing winding 15. Positive potentials induced into the balancing winding 15 are conducted via the diode 37.

In one practical embodiment of the line circuit an optimum degree of compensation is obtained by providing the resistive components as thick film resistive components on a substrate. After the circuit is assembled, it is operated with a simulated subscriber loop circuit to facilitate a final tuning or optimization of its operating characteristics. Laser trimming, well known and practiced as a means by which the values of thick film components are adjusted, is used to arrive at the optimum values for loop direct current compensation and common mode rejection in the current sensing circuit. Optimum common mode rejection by the differential amplifier 20 is preferred in the current sensing circuit. This is to ensure that longitudinally induced voltages have no significant effect upon current compensation in the transformer 10.

The line circuit also includes detection and ringing circuits for transferring an indication of OFF-HOOK and dial pulse signals to the switching facility and for supplying ringing signals to the subscriber loop. A differential amplifier 40 includes inverting and non-inverting inputs, the inverting input being connected to the emitter electrode of the transistor 31 via a resistor 38. A capacitor 41 is connected between the inverting input and the output of the amplifier 40. Diodes 42 and 46, with their respective cathodes connected in common, are connected in series-opposing relationship between the output of the differential amplifier 40 and the base electrode of a transistor 47. Resistors 43 and 49 are connected in series between the junction of the diodes 42 and 46 and the non-inverting input of the differential amplifier 40. The junction between the resistors 43 and 49 is connected to a ring control circuit 60 in the switching office via a terminal 61. The non-inverting input of the differential amplifier 40 is also connected to the power supply −V and to ground via resistors 44 and 45 respectively. The emitter electrode of the transistor 47 is connected to ground. A relay K is connected between −V and the collector electrode of the transistor 47. A diode 48 is connected in parallel with the relay K. The relay contacts K1, K2 and K3 are associated with and operated by the relay K.

A differential amplifier 50 has a non-inverting input connected to −V and ground via resistors 52 and 51 respectively, and an inverting input connected directly to the output of the differential amplifier 20. The output of the differential amplifier 50 is connected to an output terminal 55 via a resistor 53. The anode of a diode 54 is connected to the terminal 55 and the cathode of the diode 54 is connected to the output of the differential amplifier 40.

The differential amplifier 50 operates in response to the signal from the current sensing circuit to indicate at the terminal 55, the "hook" state of the subscriber apparatus 5. It also follows dial pulse signals from the subscriber apparatus 5. The output state of the differential amplifier 50 changes as the signal traverses the reference potential derived by the resistors 51 and 52, as for example in the case of a transition of the subscriber apparatus from the ON-HOOK to the OFF-HOOK state. The differential amplifier 40 responds more slowly to variations in the potential at the emitter electrode of the transistor 31. In the ON-HOOK state, the emitter electrode of the transistor 31 is usually near or at ground potential as there is no loop current intended. However leakage current on one side of the loop and possibly via the subscriber apparatus may exist and must be compensated for. Such leakage current causes the transistor 31 to conduct a small amount of current. The inverting input of the differential amplifier 40 is at a lower potential than the non-inverting input which is biased positively from the ringing control circuit 60 via the terminal 61 and the resistor 43. Thus the output of the differential amplifier 40 is positive, preventing current flow at the base electrode of the transistor 47 to maintain the K relay in its rest state. The power source −V is thus connected to the subscriber loop 9 via the break portion of the transfer contact K1 and the windings 12 and 13. The capacitor 19b is connected between the windings 12 and 13 via the break contact K2 to provide a low a-c impedance shunt across the resistors 17 and 18.

In the event that the subscriber apparatus 5 goes OFF-HOOK, the potential at the emitter electrode of the transistor 31 becomes more negative and the relay K remains at rest. The output of the differential amplifier 20 crosses the threshold voltage determined by the resistors 51 and 52 causing the output of the differential amplifier 50 to become positive. This positive voltage is transmitted via the terminal 55 to the switching office. Subsequently dial pulses are typically relayed from the subscriber loop in like manner via the differential amplifiers 20 and 50. When the subscriber apparatus 5 returns to the ON-HOOK state, the output of the differential amplifier 50 is restored to the previous negative state.

During dialling, the slow response time of the differential amplifier 40 prevents any significant fluctuations in the state of the positive output of this amplifier.

In the case of a ringing requirement, the ringing control circuit 60 in the switching facility applies a negative potential, for example −6 volts, to the junction of the resistors 43 and 49 in accordance with the required ringing interval. This causes the base emitter junction of the transistor 47 to become forward-biased, thus switching the transistor ON and operating the contacts K1, K2 and K3 associated with the relay K. The transfer contacts K1 disconnect −V and connect the ringing source 3 to the line circuit to supply ringing signals to subscriber apparatus 5 via the subscriber loop 9. The ringing signal is typically an alternating current signal of about 80 to 120 volts in a frequency range of between 15 and 60 Hz, imposed upon a d-c voltage similar to the voltage from −V. The break contact K2 disconnects the capacitor 19b from the circuit and the make contact K3 short circuits the winding 12. Hence the impedance between the ringing source and ground is substantially increased and the a-c impedance of the winding 13 is reduced to almost zero. At the same time, the threshold voltage at the non-inverting input of the differential amplifier 40 becomes more negative as a result of the −6V potential from the ringing control circuit 60 applied via the resistor 43. As the input potential at the inverting input of the differential amplifier 40 is at about ground, the output becomes negative. This clamps the potential at the terminal 55 at a negative value via the diode 54, and so inhibits the output of the differential amplifier 50. As direct current continues to be supplied to the subscriber loop from −V during the dormant portion of the ringing interval, the circuit performs as previously described when the subscriber apparatus does OFF-HOOK during the dormant period. When the subscriber apparatus goes OFF-HOOK during an active portion of the ringing interval the differential amplifier 30 in the current regulation circuit responds to the output of the differential amplifier 20 in the current sensing circuit to permit current to flow in the third winding 15 via the transistor 31. As the voltage at the emitter electrode of the transistor 31 becomes more negative, the potential at the inverting input of the differential amplifier 40 crosses the threshold potential at the non-inverting input causing the output to become positive. This has the effect of turning the transistor 47 OFF via the diodes 42 and 46 and unclamping the output of the differential amplifier 50 via the diode 54. Hence the relay K returns to its rest state, disconnecting the ringing source 3 and reconnecting −V to the loop 9, and an OFF-HOOK indication is presented to the switching office via the terminal 55.

Other embodiments of the invention are envisaged in which for example the currents in the tip and ring leads are respectively sensed by current transducer means incorporating for example Hall effect devices or magnetoresistive elements. However, in every case the sum of the currents in the tip and ring leads is determined and used to control the amount of compensating current in the third winding 15. This allows the subscriber loop energizing current to be substantially compensated in the transformer 10 in spite of tip and ring current imbalances, intentional or otherwise.

What is claimed is:

1. A telephone line circuit for interfacing a subscriber loop to an associated telephone switching facility, the telephone line circuit comprising:

power and ground terminals for connection to a source of power;

a transformer including a core of saturable magnetic material, a first winding for connection across the tip and ring leads of the subscriber loop and to said terminals, a second winding for connection to the switching facility and a balancing winding, the core material being limited in bulk to that sufficient to transmit typical alternating current voice signals between the first and second windings and to saturate in the presence of larger alternating current signals;

a current sensing circuit responsive to current flow in the subscriber loop for generating a signal proportional to the sum of the direct current components in the tip and ring leads;

current regulation means connected in series with the balancing winding and the power and ground terminals, and responsive to the signal from the current sensing circuit to conduct current via the terminals and the balancing winding in an amount sufficient to substantially cancel the direct current flux of the first winding;

whereby abnormally large pulse signals and the like cause the core material to saturate and impede transmission of signals between the first and second windings.

2. A telephone line circuit as defined in claim 1 in which the current sensing circuit includes a differential amplification means and in which the first winding includes first and second portions for connection to the tip and ring leads respectively and for connection to the ground and power terminals respectively via first and second resistors;

one of the inputs of the differential amplification means being connected to the junction of the first resistor and the first portion of the first winding, the other of the inputs of the differential amplification means being connected to the junction between the second resistor and the second portion of the first winding.

3. A telephone line circuit as defined in claim 1 in which the current regulation means comprises:

an emitter follower circuit in series with the balancing winding and including a transistor having collector, base, and emitter electrodes, the collector electrode being connected to the balancing winding, and a third resistance connected between the ground terminal and the emitter electrode;

a voltage follower circuit having an output connected to the base electrode of the transistor and an input;

a low pass filter circuit connected between the input of the voltage follower circuit and the output of the current sensing circuit.

4. In a telephone system comprising a subscriber loop having tip and ring leads, a power source having power and ground terminals for supplying energizing current to the telephone via the loop, a source of ringing signals, ringing control means, and an associated telephone switching facility, a telephone line circuit for interfacing the subscriber loop to the switching facility, comprising:

a transformer including a core of saturable magnetic material, a first winding for connection across the tip and ring leads and to the power source, a second winding for connection to the switching facility and a balancing winding;

a current sensing circuit responsive to current flow in the subscriber loop for generating a signal proportional to the sum of the direct current components in the tip and ring leads;

current regulation means connected in series with the balancing winding and the power source, and responsive to the signal from the current sensing circuit to conduct current via the power source and the balancing winding in an amount sufficient to substantially cancel the direct current flux of the first winding;

switch means for alternately connecting said source of power and said source of ringing signals to the subscriber loop in response to signals from the ringing control means and for disconnecting said source of ringing signals from the subscriber loop and connecting the power source thereto in response to a signal from the current sensing means indicating the subscriber loop is terminated in an OFF-HOOK condition.

5. A telephone system as defined in claim 4 and further comprising means for transferring the signal from the current sensing circuit to the switching facility, and means for inhibiting the transfer of said signal during the presence of ringing signals on the subscriber loop, whereby the OFF-HOOK condition is signalled to the switching facility and dial pulse signals are transferred to the switching facility during the OFF-HOOK condition.

* * * * *